July 30, 1963 M. MANSON Re. 25,428

SLIDE BRACKETS

Original Filed Nov. 29, 1960 2 Sheets-Sheet 1

*INVENTOR.*
MORRIS MANSON
*BY* E. T. Pomeroy
ATTORNEY

July 30, 1963 M. MANSON Re. 25,428

SLIDE BRACKETS

Original Filed Nov. 29, 1960 2 Sheets-Sheet 2

INVENTOR.
MORRIS MANSON
BY
ATTORNEY

United States Patent Office

Re. 25,428
Reissued July 30, 1963

25,428
SLIDE BRACKETS

Morris Manson, Great Neck, N.Y., assignor to Corox Corporation, Yonkers, N.Y., a corporation of New York Original No. 3,022,129, dated Feb. 20, 1962, Ser. No. 72,467, Nov. 29, 1960. Application for reissue Mar. 22, 1962, Ser. No. 183,987
6 Claims. (Cl. 312—343)

Matter enclosed in heavy brackets [ ] appears in the original patent but forms no part of this reissue specification; matter printed in italics indicates the additions made by reissue.

This invention relates to slide brackets, and is particularly directed to devices for slidably supporting and guiding pull-out drawers.

A common construction of slide bracket of said type comprises a stationary channel-like guide member attached to the bottom of the drawer case or housing, and a slide member attached to the under side of the drawer and being slidably disposed within said stationary guide member and in rolling engagement with ball bearings supported by a carrier and movable along tracks adjacent the upper portion of the channel-like guide member, the arrangement being such that upon an operative outward pull of the drawer, the slide member—as well as the drawer attached thereto—are maintained, during their operative movement, along a fixed longitudinal path as determined by the sides of the guide member. It is not an infrequent occurrence in such constructions that when the drawer is pulled out a considerable distance—and particularly when it is pulled out to its fullest extent—a downward force applied to the forward part of the drawer causes a disengagement of the slide member from said stationary guide member, so that if the drawer is not caught and manually supported it will drop to the ground. This is due to the fact that under the considerable leverage afforded by the extended position of the drawer and slide member, the effective applied force is sufficiently great to cause the slide member to lift the ball bearings upwardly against the upper edges of the grooved track, causing a slight outward deflection of the legs of the channel-like stationary member, whereby either the slide member slips out of engagement with the balls, or the balls themselves frictionally slip over the edges of the channel, thereby freeing the slide member from its operative position within the stationary guide member. It is accordingly an object of my invention to provide a slide bracket of the aforesaid class not having the aforesaid shortcoming. Specifically, it is one of my objectives to provide effective retaining means in coactive relation with the components of the bracket of the above-mentioned category whereby said components are held against disengagement during all positions of the drawer and slide, including their extreme outer position.

In the above-mentioned aspect of my invention, it is a further object thereof to enable the said retaining means to be applied to the above-described common type of slide bracket construction, thereby producing a novel combination in which certain unutilized elements are given functions of great utility.

In the manufacture and assembly of drawer structures fitted with slide brackets of the aforesaid type, it is necessary to insert and remove the drawer many times, and inasmuch as the slide member is hidden from view, the operative insertion thereof into the stationary guide member is often a hit-and-miss operation. Where mass production economies must be effected, this presents a serious problem, since a proper fitting of the slide member into the guide member is with conventional construction, a time-conuming task. And when the fitting is done hurriedly, there is the danger that the slide component may hit the ball bearings and dislodge them, or the possibility that it may strike the forward edge of the ball-carrier either to force the balls out of position or drive the carrier over the rear stop—causing damage or delay due to the required resetting operations. It is accordingly my further objective to eliminate these dangers incident to the said repeated fitting operations of said slide bracket drawer structure by providing effective guide means to facilitate and expedite the assembling operations of the bracket components. In this aspect of my invention it is another object thereof to employ a single member that will serve the said function of guiding means for assembly purposes as well as the aforesaid function of retainer means to prevent a detachment of the bracket components.

And it is my objective to provide a simple, readily fabricated and easily assembled device having the features above mentioned.

Other objects, features and advantages will appear from the drawings and the description hereinafter given.

Referring to the drawings.

Figure 2:
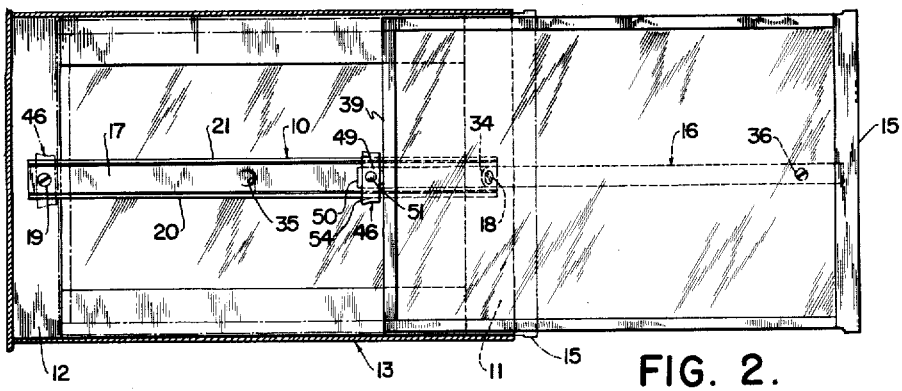
FIG. 2 is a plan view of FIG. 1.
Figure 1:
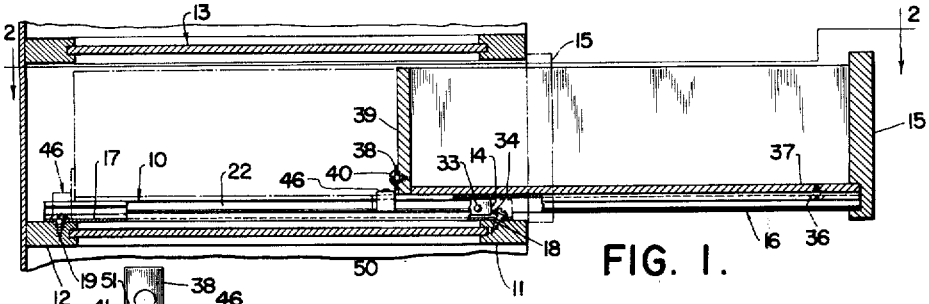
FIG. 1 is a vertical section of a drawer assembly in combination with the slide bracket of my invention, the drawer being shown in its extreme outer position, fragments of the stationary guide member being removed for clarity, the dot-dash position showing the drawer in its closed position.
Figure 4:
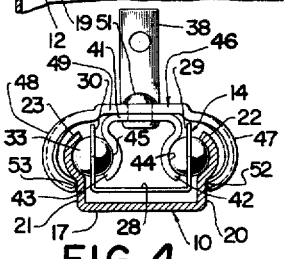
FIG. 4 is a section of FIG. 3 taken along line 4—4.
Figure 5:
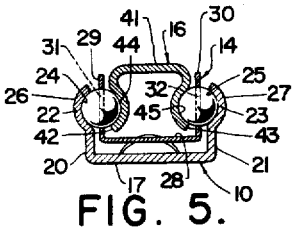
FIG. 5 is a section of FIG. 3 taken along line 5—5, the retainer member not being shown.
Figure 3:
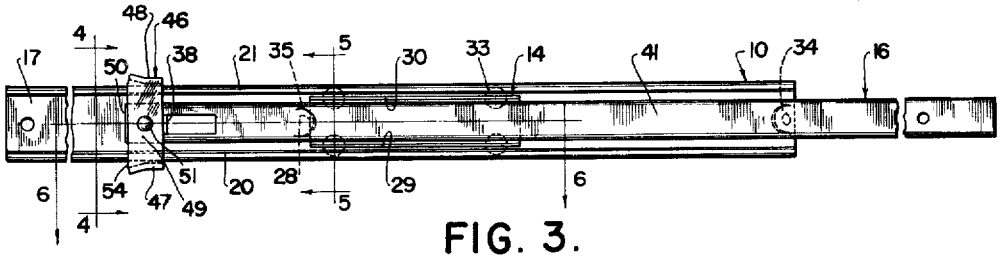
FIG. 3 is an assembled plan view of the guide bracket of my invention, shown without the drawer assembly, portions being braken away for clarity.

In the form of my invention illustrated in the drawings, the stationary guide member 10 is shown attached to the respective front and rear walls 11 and 12 of the case or drawer housing generally designated 13. Rollably disposed within said stationary member 10 is the ball carrier generally designated 14. Attached to the underside of drawer 15 is the slide member generally designated 16. As is apparent from FIGS. 1 and 2, and as will more clearly hereinafter appear, when said drawer 15 is operatively disposed within the case 13, the said slide member 16 is within said stationary guide member 10, a portion of the slide member being disposed within the lateral confines of ball carrier 14 and in rollable engagement therewith. The components above described are, in their general coactive relation, functionally similar to slide brackets known to those skilled in the art. The arrangement is such that when the drawer 15 is movably manipulated either forwardly or rearwardly, the slide member 16 rollably actuates the carrier 14 which in turn rollably moves within the stationary guide member 10, whereby the path of the drawer 15 is maintained in the direction of the longitudinal extent of said guide member 10.

In accordance with the specific construction of the above-mentioned members and the associated elements as employed in the embodiment of my invention illustrated, the said stationary guide member 10, the ball carrier 14 and the slide member 16 are all substantially of channel-shaped construction. The stationary member 10 comprises the bottom base 17 attached by fasteners 18 and 19 to the said respective front and rear walls 11 and 12, and two legs 20 and 21 extending upwardly from said base 17. The upper portions of said legs comprise the respective outwardly bulged portions 22 and 23, these extending longitudinally of said legs and forming along the inside surfaces of the legs the respective longitudinal grooves 24 and 25 constituting inner ball-bearing tracks, and forming along the outer surfaces of said legs the outer longitudinal ridges *26* [25] and 27 constituting outer tracks for coaction with a combination guide and retaining member to be hereinafter described.

The said channel-shaped ball carrier 14 comprises the base 28, of lesser transverse width than that of said base 17, and two upwardly extending legs 29 and 30, the latter having two apertured portions 31 in said leg 29 and two apertured portions 32 in said leg 30, said apertured portions being proportioned and positioned for rotatably supporting therein the ball bearings generally designated 33. The said legs 29 and 30 of the carrier member 14 are in spaced relation to the corresponding walls *20 and* 21 [and 22] of the stationary member 10 so as to enable free rolling movement of the balls 33 along the said grooved inner tracks 24 and 25, said balls being positioned and proportioned for operative engagement with said tracks 24 and 25 in a manner to enable the carrier member 14 to operatively move within member 10 between the respective front and rear stop members 34 and 35, said stop members extending upwardly from the base 17. The distance between said stop members and the length of carrier member 14 is such as to enable the latter to operatively move a predetermined distance along the stationary member 10, said distance being a function of the full operative movement of the drawer 15 and the attached slide member 16. The latter member is secured by fastener 36 to the bottom wall 37 of the drawer 15, the slide member having an upwardly extending rear lug 38 which engages the rear surface 39 of said drawer and is attached thereto by the fastener 40.

The said slide member 16 comprises the web 41 and the downwardly extending legs 42 and 43, said legs having the two inwardly extending longitudinal grooved portions 44 and 45 constituting tracks for the said balls 33 complementary to said tracks 24 and 25. The said web 41 is of lesser transverse width than the distance between the said legs 29 and 30 of the ball carrier, the said slide track portions 44 and 45 being proportioned and positioned to rollably engage the said balls 33 when the carrier 14 is operatively positioned within the stationary member 10.

Attached to the rearmost portion of slide member 16 is the combination guide and retaining member generally designated 46. Said member, in the preferred form illustrated, is a substantially C-shaped yoke comprising two oppositely inwardly extending hooked portions 47 and 48 and an upper connecting portion 49 secured to the rear section 50 of slide member 16 directly behind the said lug 38 by the fastener 51. The said member 46 is so positioned and proportioned that the said connecting portion 49 overlies and extends transversely across the upper portions of the members 10, 14 and 16, the said inwardly extending hooked portions 47 and 48 being curved so as to extend around and underneath said longitudinal ridges 26 and 27, the bottom edges 52 and 53 of said hooked portions 47 and 48 underlying said ridges 26 and 27. In the embodiment shown, said hooked portions 47 and 48 are in slidable interengagement with said ridges 26 and 27, whereby the latter serve both as tracks and retaining means for said hooked portions, as will more clearly hereinafter appear. In the preferred embodiment, the rear portion 54 of member 46 is flared laterally outwardly and rearwardly.

Figure 8:
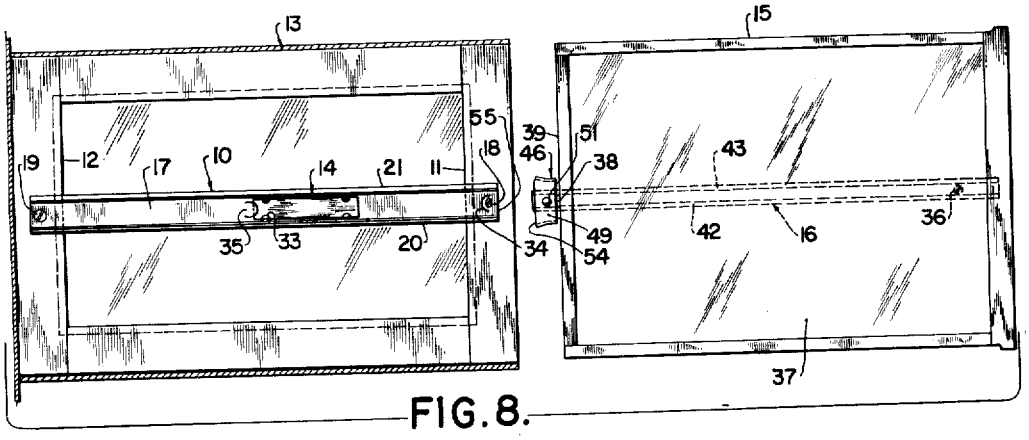
FIG. 8 is a disassembled plan view of the drawer case and drawer provided with my invention, the drawer component being shown in position just prior to the assembling operation.
Figure 9:
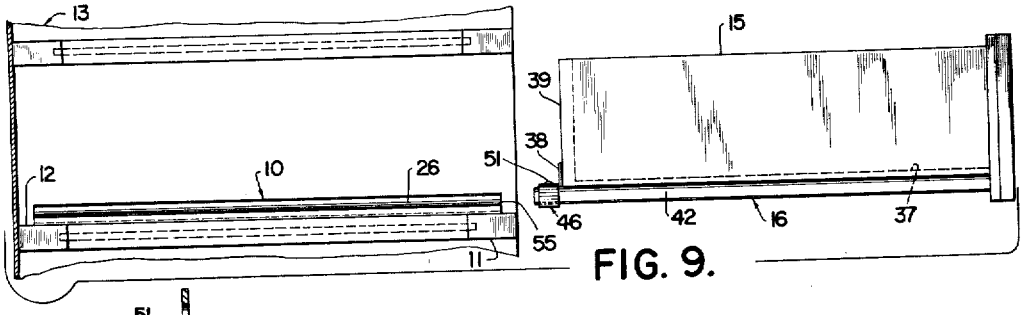
FIG. 9 is a side elevation of FIG. 8.
Figure 6:
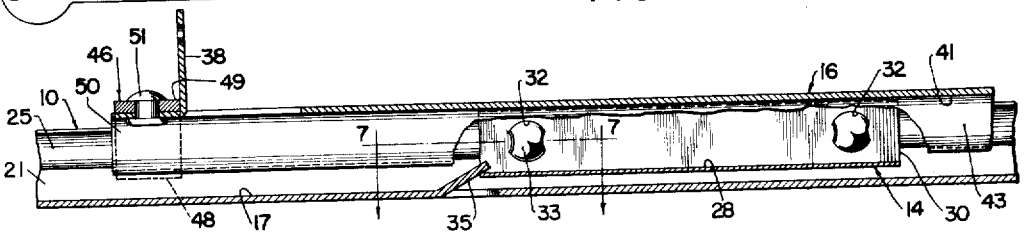
FIG. 6 is a fragmentary longitudinal section of FIG. 3 taken along line 6—6.
Figure 7:
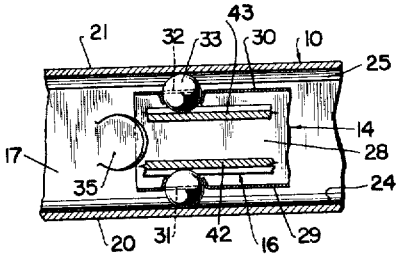
FIG. 7 is a fragmentary longitudinal section of FIG. 6 taken along line 7—7.

In operatively inserting the drawer 15 into its case 13, the former is so positioned with respect to the case that the flared portion 54 of member 46 is adjacent to and in longitudinal alignment with the front edge 55 of the stationary member 16. Because of the said flared configuration of the rear of member 46, the inwardly extending hooked portions 47 and 48 of member 46 can readily be mounted over and brought into slidable engagement over the said legs 20 and 21 of the stationary member 10, as indicated in FIGS. 8 and 9. The facility of such assembling operation is apparent from the fact that said member 46 is clearly within view, since it is positioned rearwardly beyond the said rear surface 39 of the drawer 15. Once member 46 is operatively positioned over the front part of stationary member 10 a rearward movement of the drawer will cause said hooked portions 47 and 48 to slidably move along the said outer track ridges 26 and 27. Inasmuch as said member 46 is fixedly secured to slide member 16, the aforesaid positioning of member 46 over the front of stationary member 10 will bring the downwardly extending legs 42 and 43 of the slide member 16 into their proper inwardly disposed positions with respect to the upwardly extending legs 29 and 30 of the ball carrier member 14. The grooved tracks 44 and 45 of said legs 42 and 43 of the slide member 16 will then be adapted for rolling engagement with said balls 33, in the manner aforesaid. A continued inward push of the drawer must accordingly result in a movement thereof along a path parallel to the longitudinal extent of the stationary guide member 10.

In view of the fact that the said hooked portions 47 and 48 of member 46 are in embracing engagement with the longitudinal track ridges 26 and 27, there is no possibility that the slide member 16 will become disengaged from the stationary member 10. It is to be noted that when the drawer member is pulled outwardly to its extreme position illustrated in FIG. 1, both the carrier member 14 and the guide and the retainer member 46 are disposed at the front of the stationary member 10, so that any downward force applied to the front of the drawer would bring the said bottom edges 52 and 53 of the member 46 into engagement with the undersides of said ridges 26 and 27, whereby the rear portion of the slide member 16 would be held against disengagement from the stationary member 10. If it is assumed that the front edge 55 of the stationary member 10 is the fulcrum of member 16 as a lever, an upward movement of the said rearmost portion 50 of member 16 due to a downward force applied to the front of the lever would result in an upward pressure exerted against the top connecting portion 49 of member 46; but no further upward movement would be possible in view of the interengagement of the hooked portions 47 and 48 of member 46 with said ridges 26 and 27. There could thus be no detachment of member 16 from the stationary member 10, as occurs in conventional structures of the category above referred to.

In the above description, the invention has been disclosed merely by way of example, and in preferred manner; but obviously many variations and modifications may be made therein. It is to be understood, therefore, that the invention is not limited to any specific form or manner of practicing same, except insofar as such limitations are specified in the appended claims.

I claim:

1. In a drawer slide bracket construction, a stationary channel-shaped guide member comprising a base and two laterally opposite upwardly extending legs, the upper portions of said legs having at the respective inner surfaces thereof recessed ball-bearing tracks and at the respective outer surfaces thereof outwardly protruding tracks, said tracks extending longitudinally of their respective legs; a channel-shaped slide member comprising a base and two laterally opposite downwardly extending legs disposed inwardly of said upwardly extending legs; bearing means in operative engagement with said ball-bearing tracks in said upwardly extending legs and the respective adjacent downwardly extending legs, whereby said slide member is movable longitudinally relative to said stationary member; and separate retaining means on said slide member having opposite hooked portions in underlying slidable engagement with said outwardly protruding tracks.

2. In a drawer slide bracket construction, the combination according to claim 1, said retaining means being of substantially C-shaped configuration and comprising said two hooked portions and a connecting portion therebetween, and fastening means securing said connecting portion to said base of said slide member.

3. In a drawer slide bracket construction, the combination according to claim 1, said hooked portions being flared laterally outwardly and rearwardly.

4. The combination of a slide bracket device and a drawer construction having a case and a drawer slidably movable therein, comprising a stationary channel-shaped guide member having a base and two laterally opposite upwardly extending legs, said base being affixed to the bottom of said case, the upper portions of said legs having at the respective inner surfaces thereof recessed ball-bearing tracks and at the respective outer surfaces thereof outwardly protruding tracks; said tracks extending longitudinally of their respective legs; a channel-shaped slide member comprising a base and two laterally opposite downwardly extending legs disposed inwardly of said upwardly extending legs, said last-mentioned base being attached to the underside of said drawer, said slide member extending rearwardly beyond said drawer; bearing means in operative engagement with said ball-bearing tracks in said upwardly extending legs and the respective adjacent downwardly extending legs, whereby said slide member and said drawer are movable longitudinally relative to said stationary member and said case; and retaining means on said rearwardly extending portion of said slide member and having opposite hooked portions in underlying slidable engagement with said outwardly protruding tracks.

*5. The combination of a slide bracket device and a drawer construction having a case and a drawer slidably movable therein, comprising a stationary channel-shaped guide member affixed to the bottom of said case, said guide member having laterally opposite walls with ridge portions extending longitudinally therealong forming inner and outer tracks, a channel-shaped slide member attached to the underside of said drawer and having laterally opposite walls disposed between said first-mentioned walls and movably mounted on said respective inner tracks of said guide member, whereby said slide member and said drawer are movable longitudinally relative to said stationary guide member and said case, said slide member extending rearwardly beyond said drawer, and retaining means on and attached to said rearwardly extending portion of said slide member and having opposite hooked portions in slidable engagement with outer tracks of said guide member, said hooked portions having bottom end portions underlying said ridge portions.*

*6. The combination of a slide bracket device and a drawer construction having a case and a drawer slidably movable therein, comprising a stationary guide member affixed to the bottom of said case, said guide member having laterally opposite inner and outer track portions extending longitudinally therealong, a slide member attached to the underside of said drawer and movably mounted on said inner track portions of said guide member, whereby said slide member and said drawer are movable longitudinally relative to said stationary guide member and said case, said slide member extending rearwardly beyond said drawer, and retaining means on and attached to said rearwardly extending portion of said slide member and having opposite hooked portions in slidable engagement with said outer track portions of said guide member, said hooked portions having bottom end portions underlying said outer tracks.*

References Cited in the file of this patent or the original patent

UNITED STATES PATENTS

| | | |
|---|---|---|
| 1,045,523 | Cossey | Nov. 26, 1912 |
| 1,248,133 | Kemp et al. | Nov. 27, 1917 |
| 2,559,322 | Scamser | July 3, 1951 |
| 2,608,456 | Barth | Aug. 26, 1952 |
| 2,841,460 | Rainier | July 1, 1958 |

FOREIGN PATENTS

| | | |
|---|---|---|
| 25,328 | Sweden | Aug. 22, 1908 |
| 137,355 | Australia | May 22, 1950 |
| 164,791 | Switzerland | Jan. 2, 1934 |
| 496,477 | Germany | Apr. 24, 1930 |
| 355,108 | Great Britain | Aug. 20, 1931 |